(12) United States Patent
Motomitsu (10) Patent No.: US 11,548,327 B2
(45) Date of Patent: Jan. 10, 2023

(54) BIAS TIRE

(71) Applicant: The Yokohama Rubber Co., LTD., Tokyo (JP)

(72) Inventor: Takamasa Motomitsu, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 338 days.

(21) Appl. No.: 16/608,699

(22) PCT Filed: Dec. 26, 2017

(86) PCT No.: PCT/JP2017/046777
§ 371 (c)(1),
(2) Date: Oct. 25, 2019

(87) PCT Pub. No.: WO2018/198435
PCT Pub. Date: Nov. 1, 2018

(65) Prior Publication Data
US 2021/0114418 A1 Apr. 22, 2021

(30) Foreign Application Priority Data
Apr. 28, 2017 (JP) .............................. JP2017-090422

(51) Int. Cl.
*B60C 15/02* (2006.01)
*B60C 15/06* (2006.01)
(Continued)

(52) U.S. Cl.
CPC ............ *B60C 15/0607* (2013.01); *B60C 9/06* (2013.01); *B60C 15/04* (2013.01); *B60C 15/05* (2013.01);
(Continued)

(58) Field of Classification Search
CPC ......... B60C 9/07; B60C 9/09; B60C 2200/06; B60C 2200/065; B60C 2200/14
See application file for complete search history.

(56) References Cited

U.S. PATENT DOCUMENTS

| 4,142,930 A | 3/1979 | Curtiss, Jr. |
| 4,342,351 A | 8/1982 | Kuroda |

(Continued)

FOREIGN PATENT DOCUMENTS

| JP | S53-136202 | 11/1978 | |
| JP | 6322705 | * 1/1988 | ............. B60C 13/00 |

(Continued)

OTHER PUBLICATIONS

International Search Report for International Application No. PCT/JP2017/046777 dated Apr. 10, 2018, 4 pages, Japan.

*Primary Examiner* — Cedrick S Williams
(74) *Attorney, Agent, or Firm* — Thorpe North & Western (57) ABSTRACT

Provided is a bias tire including: bead cores; a bead filler disposed outward of each of the bead cores in a radial direction; and a carcass layer stretching between the bead cores, wrapping around end portions of the bead cores, the carcass layer having opposite ends turned back to be fixed, wherein in a cross section in a meridian direction, a cord on an innermost side of the carcass layer in a tire lateral direction has a curved shape projecting laterally outward at a height from 0.9 times to 1.6 times a height of a flange of a rim on which the bias tire is assembled, and in the cross section in the meridian direction, a cord on an outermost side of the carcass layer in the lateral direction has a curved shape projecting laterally outward at a height from 1.1 times to 1.6 times the height of the flange.

20 Claims, 6 Drawing Sheets

(51) Int. Cl.
  *B60C 9/06* (2006.01)
  *B60C 15/04* (2006.01)
  *B60C 15/05* (2006.01)
  *B60C 9/02* (2006.01)
  *B60C 15/00* (2006.01)

(52) U.S. Cl.
  CPC ...... *B60C 9/0292* (2013.01); *B60C 2015/009* (2013.01); *B60C 2015/061* (2013.01); *B60C 2015/0614* (2013.01)

(56) References Cited

U.S. PATENT DOCUMENTS

| | | | | |
|---|---|---|---|---|
| 5,042,545 | A | * | 8/1991 | Kabe .................. B60C 9/28 152/454 |
| 5,277,236 | A | * | 1/1994 | Takatsu .................. B60C 3/04 152/451 |
| 5,335,707 | A | * | 8/1994 | Sano .................. B60C 9/06 152/315 |
| 5,385,190 | A | | 1/1995 | Assaad et al. |
| 2010/0139834 | A1 | | 6/2010 | Koga |

FOREIGN PATENT DOCUMENTS

| | | |
|---|---|---|
| JP | S63-265703 | 11/1988 |
| JP | H05-044606 | 2/1993 |
| JP | H05-044606 | 6/1993 |
| JP | H06-179307 | 6/1994 |
| JP | H06-191206 | 7/1994 |
| JP | H06-191241 | 7/1994 |
| JP | 2004-017692 | 1/2004 |
| JP | 2013-028200 | 2/2013 |
| WO | WO 01/17801 | 3/2001 |
| WO | WO 2008/099899 | 8/2008 |
| WO | WO 2017/057705 | 4/2017 |

* cited by examiner

BIAS TIRE

TECHNICAL FIELD

The present technology relates to a bias tire.

BACKGROUND ART

In general, an industrial vehicle tire receives a high load and is set at high pressure. For example, a heavy-duty bias tire used for a gantry crane or the like used in a port or the like has high load setting and a high center of gravity. As a result, a bias tire as described above is likely to receive an uneven load, so that vehicle drifting or tire failure may occur due to excessive deflection. However, it is difficult to apply higher pressure setting due to wheel strength and an operation management issue.

Japan Unexamined Patent Publication No. 2004-17692 discloses a radial tire. The radial tire of Japan Unexamined Patent Publication No. 2004-17692 includes a bead portion and a carcass ply, each having curvature or the like that is set to an appropriate value to improve durability of the bead portion.

In a heavy-duty bias tire, a load on a carcass around a bead tends to increase as torque increases due to recent vehicle evolution. In particular, a bias tire in a wide base (WB) size with a low aspect ratio, being used under an overload condition, cord broken up or ply separation may occur. The cord broken up, which is referred to below as CBU, is caused when a carcass ply is brought into contact with a turned end of a steel wire of a bead core at the innermost point in a tire axial direction. The CBU is caused by excessively pulling a bead and a carcass on an innermost surface side in the tire lateral direction.

The ply separation is separation fracture between a bead filler and a carcass provided in contact with the bead filler. The ply separation is caused in the tire lateral direction due to strain between an inner carcass layer close to a tire equatorial plane and an outer carcass layer farther away from the tire equatorial plane.

Japan Unexamined Patent Publication No. 2004-17692 discloses a technique for a passenger vehicle tire of a radial tire. Thus, it is inappropriate to apply the technique disclosed in Japan Unexamined Patent Publication No. 2004-17692 to a heavy-duty bias tire.

SUMMARY

The present technology provides a bias tire that can be improved in durability performance by suppressing excessive pulling of a carcass layer. A bias tire according to an aspect of the present technology includes: a pair of bead cores; a bead filler disposed outward of each of the pair of bead cores in a tire radial direction; and a carcass layer stretching between the respective pair of bead cores, wrapping around end portions of the respective bead cores, the carcass layer having opposite ends turned back to be fixed, wherein in a cross section in a tire meridian direction, a cord on an innermost side of the carcass layer in a tire lateral direction has a curved shape projecting laterally outward at any position within a range of height from 0.9 times to 1.6 times a height of a flange of a rim on which the bias tire is assembled, and in the cross section in the tire meridian direction, a cord on an outermost side of the carcass layer in the tire lateral direction has a curved shape projecting laterally outward at any position within a range of height from 1.1 times to 1.6 times the height of the flange.

It is preferable that in a cross section in the tire meridian direction, the cord on the innermost side of the carcass layer in the tire lateral direction has a radius of curvature R1 at a position at height 1.5 times the height of the flange, and has a radius of curvature R3 at a position at length of one-third of a length along the tire radial direction from a maximum height position of the carcass layer to a maximum width position of the carcass layer, a ratio R1/R3 being from 0.5 to 1.0.

It is preferable that in a cross section in the tire meridian direction, the bead filler has a thickness in the tire lateral direction that gradually decreases radially outward from the corresponding one of the bead cores.

It is preferable that the pair of bead cores is one of a plurality of the pairs of bead cores, a plurality of the bead fillers and a plurality of the carcass layers are provided corresponding to the respective bead cores, and the plurality of the carcass layers is turned back to be fixed while wrapping around the corresponding bead cores and the bead fillers corresponding to the respective bead cores, and that in a cross section in the tire meridian direction, one of the plurality of bead fillers has a maximum height in the tire radial direction, the maximum height being from 0.17 times to 0.23 times a cross-sectional height of a carcass.

It is preferable to further include another carcass layer for covering the plurality of the carcass layers corresponding to the respective plurality of the pairs of bead cores.

It is preferable that at a position at height 1.5 times the height of the flange in a cross section in the tire meridian direction, the radius of curvature R1 of the cord on the innermost side of the carcass layer in the tire lateral direction, and a radius of curvature R2 of the cord on the outermost side of the carcass layer in the tire lateral direction, have a ratio R1/R2 that is from 1.0 to 1.8.

It is preferable that at a position at height 1.5 times the height of the flange in a cross section in the tire meridian direction, the radius of curvature R1 of the cord on the innermost side of the carcass layer in the tire lateral direction, and a radius of curvature R4 of a tire profile line, have a ratio R1/R4 that is 2.5 or less.

It is preferable that the carcass layer includes from four to eight carcasses.

It is preferable that the cord on the innermost side of the carcass layer in the tire lateral direction has an angle of from 25 degrees to 45 degrees to a tire circumferential direction.

It is preferable that in a cross section in the tire meridian direction, the cord on the innermost side of the carcass layer in the tire lateral direction has the curved shape including an inflection point at which the curved shape changes from projecting inward in the tire lateral direction to projecting outward in the tire lateral direction, the inflection point being positioned within a range of height from 0.25 times to 0.75 times the height of the flange.

It is preferable that in a cross section in the tire meridian direction, the cord on the outermost side of the carcass layer in the tire lateral direction has the curved shape including an inflection point at which the curved shape changes from projecting inward in the tire lateral direction to projecting outward in the tire lateral direction, the inflection point being positioned within a range of height from 0.60 times to 1.15 times the height of the flange.

The bias tire according to the present technology enables improvement in durability performance by causing each of the cord on the innermost side of the carcass layer in the tire lateral direction and the cord on the outermost side thereof to have the curved shape projecting outward in the tire lateral direction.

DETAILED DESCRIPTION

Hereinafter, a bias tire according to an embodiment of the present technology will be described in detail with reference to the drawings. However, the present technology is not limited to the embodiment. Constituents of the embodiment include elements that are essentially identical or that can be substituted or easily conceived by one skilled in the art. Modified examples described in the embodiment can be combined as desired within the scope apparent to one skilled in the art. In a description below of each drawing, an identical or substantially similar component to that of another drawing is denoted by the same reference sign, and description of the component is simplified or eliminated.

Figure 1:
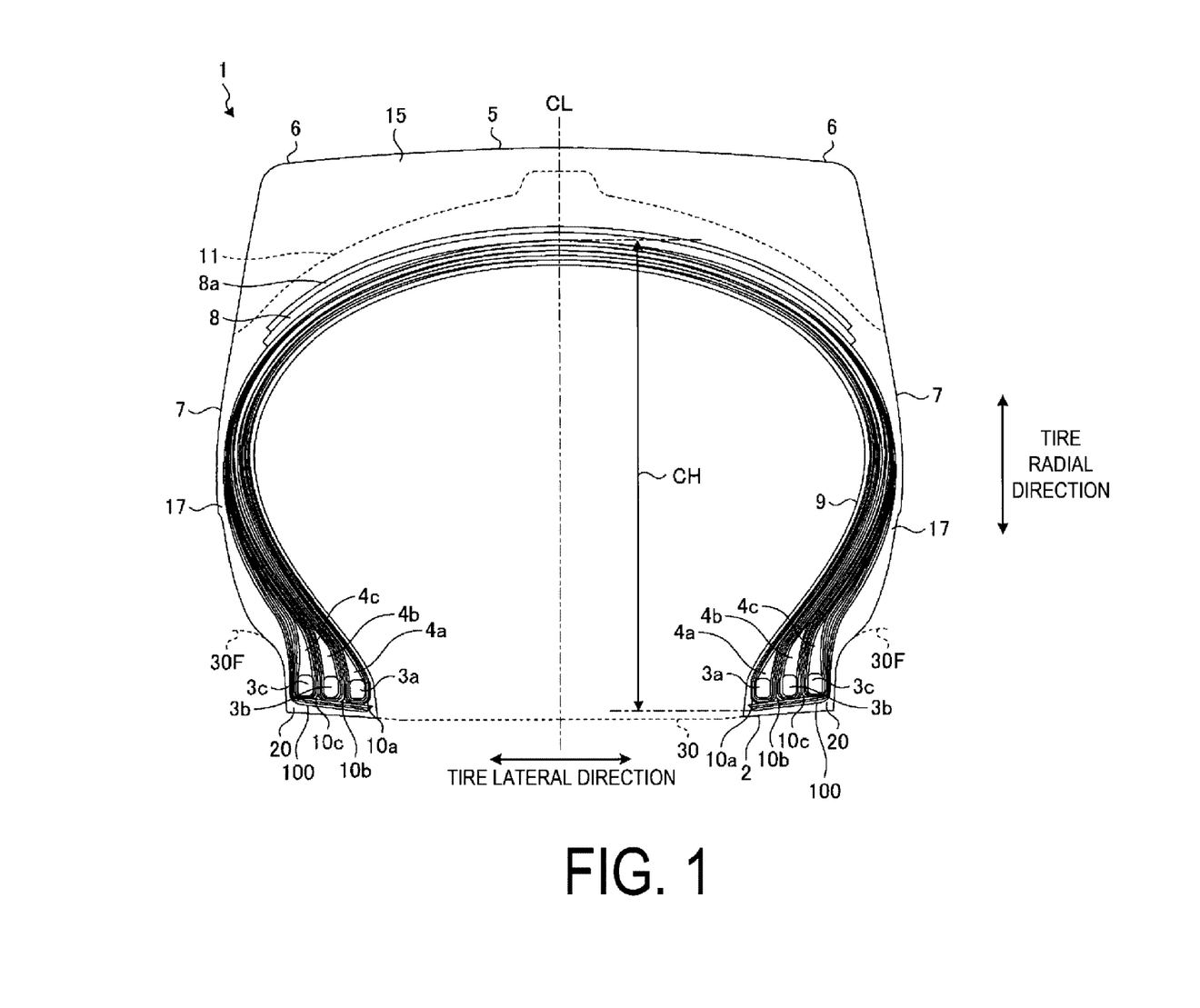
FIG. 1 is a cross-sectional view in a tire meridian direction of a bias tire according to the present embodiment.
Figure 2:
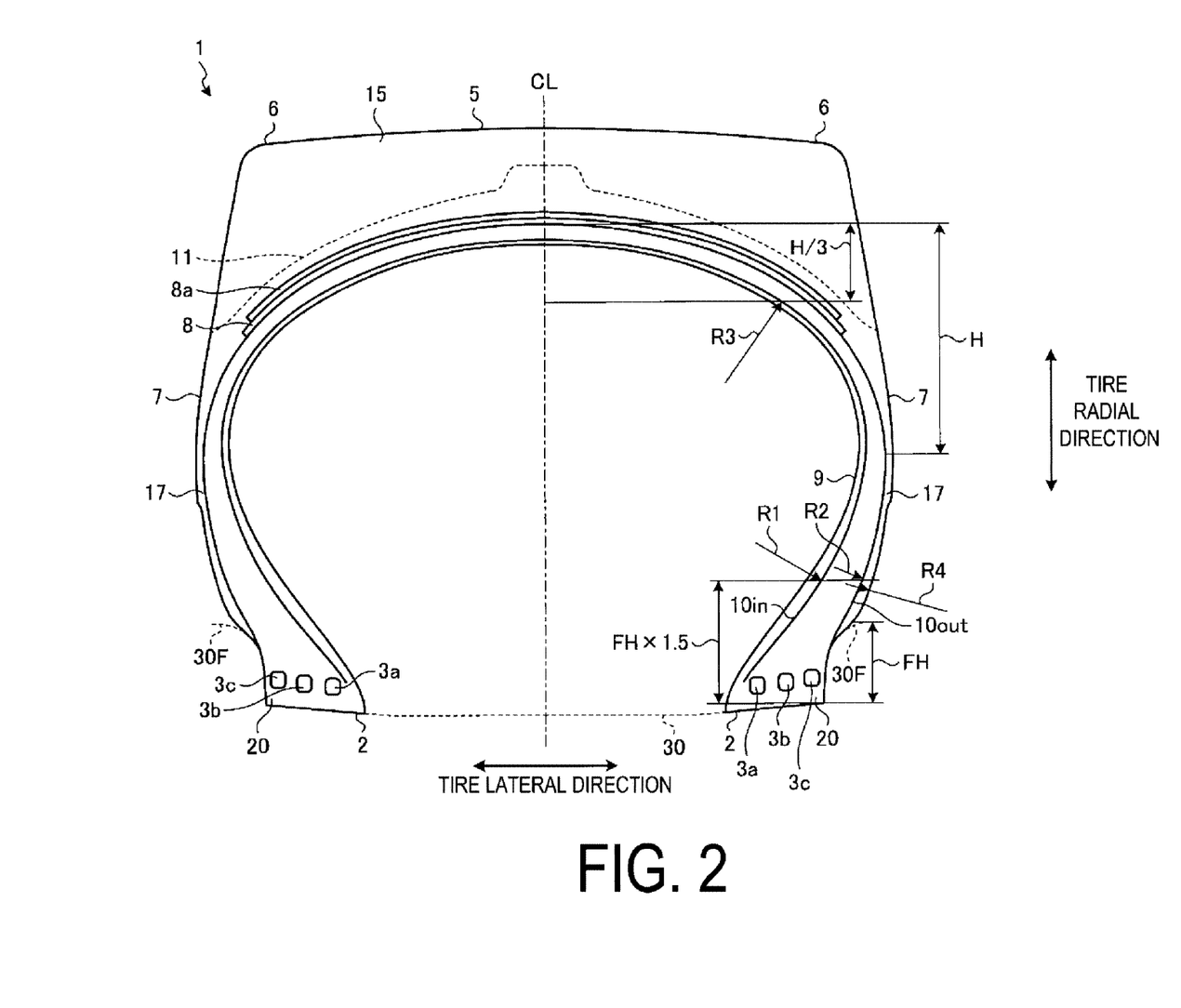
FIG. 2 is a view illustrating the bias tire of FIG. 1 by eliminating a part of the bias tire.

The bias tire according to the embodiment of the present technology will be described. FIG. 1 is a cross-sectional view in a tire meridian direction of the bias tire according to the present embodiment. FIG. 1 illustrates a cross-sectional view in a tire radial direction. FIG. 2 is a view illustrating the bias tire of FIG. 1 by eliminating a part of the bias tire. FIGS. 1 and 2 each illustrate a heavy-duty bias tire as an example of a bias tire.

In FIG. 1, the cross section in the tire meridian direction refers to a cross section of the tire taken along a plane including a tire rotation axis (not illustrated). Reference sign CL denotes the tire equatorial plane and refers to a plane normal to the tire rotation axis that passes through the center point of the tire in the tire rotation axis direction. The tire radial direction refers to a direction perpendicular to the tire rotation axis. The tire lateral direction refers to a direction parallel to the tire rotation axis, and the tire circumferential direction refers to a direction around the tire rotation axis.

In FIG. 1, a bias tire 1 of the present embodiment has an annular structure centered on the tire rotation axis. The bias tire 1 of the present embodiment includes a plurality of (three in FIG. 1) bead cores 3a, 3b, and 3c embedded in a left-and-right pair of bead portions 2 and 2. FIG. 1 illustrates a specified rim with a dashed line. FIG. 1 illustrates a shape of the bias tire 1 mounted on a rim. When the tire is not mounted on a rim 30, an end portion of the bead portions 2, 2 is positioned radially inward of the position illustrated.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

The bias tire 1 includes bead fillers 4a, 4b, and 4c corresponding to bead cores 3a, 3b, and 3c, respectively. The bead fillers 4a, 4b, and 4c are rubber materials disposed radially outward of the corresponding one of the pairs of bead cores 3a, 3b, 3c. In a cross section in the tire meridian direction, the bead fillers 4a, 4b, and 4c each gradually decrease in thickness radially outward from a position of the corresponding one of the bead cores 3a, 3b, and 3c. Reducing rigidity of each of the bead fillers 4a, 4b, and 4c gradually and radially outward prevents concentration of strain when the bias tire 1 flexes, and CBU and separation between carcass plies due to localized strain concentration.

The bias tire 1 includes a plurality of carcass layers 10a, 10b, and 10c, in which cord directions intersect each other among them, for the bead cores 3a, 3b, and 3c, respectively. The carcass layers 10a, 10b, and 10c are turned up from the inside to the outside in the tire lateral direction while their cord directions intersect each other between adjacent carcass layers. Each of the carcass layers 10a, 10b, and 10c is stretched between the corresponding one of the pairs of bead cores. In addition, the carcass layers 10a, 10b, and 10c wrap around the bead cores 3a, 3b, and 3c and their corresponding bead fillers 4a, 4b, and 4c, respectively, and are fixed with their ends turned back.

In a cross section in the tire meridian direction, one of the plurality of bead fillers 4a, 4b, and 4c has the greatest height in the tire radial direction, the highest height being within a range of height from 0.17 times to 0.23 times a cross-sectional height CH of a carcass. Setting the greatest height in the tire radial direction of the one of the bead fillers to be within the range is particularly effective in preventing CBU and separation between carcass plies in a high load and high torque vehicle having a plurality of pairs of bead cores.

The bias tire 1 further includes another carcass layer 100 for covering the plurality of carcass layers 10a, 10b, and 10c corresponding to the plurality of pairs of bead cores 3a, 3b, and 3c, respectively. The carcass layer 100 has a so-called turned-down structure in which the carcass layer 100 terminates radially inward of a bead portion 2 with an end portion that is not turned up. The carcass layer 100 may terminate while the end portion is turned up to wrap around the whole of the plurality of carcass layers 10a, 10b, and 10c. The carcass layer 100 may also have an end portion that terminates beside the bead core 3c, i.e., outward of the bead core 3c in the tire lateral direction. In FIG. 1, a part of each of the carcass layers 10a, 10b, 10c, and 100 is not illustrated.

It is preferable that each of the carcass layers 10a, 10b, 10c, and 100 includes from four to eight carcasses. When the number of carcasses included in each of the carcass layers 10a, 10b, 10c, and 100 is less than four in a high load and high torque vehicle, the carcasses are insufficient to support a bead. When the number of the carcasses is more than eight, workability during molding of the bias tire 1 will be significantly impaired. Thus, both the numbers are not preferable.

The carcass layers 10a, 10b, 10c, and 100 each include a carcass ply formed by performing a rolling process on a plurality of carcass codes that is made of steel or an organic fiber material (e.g., aramid, nylon, polyester, rayon, or the like), and that is covered with coating rubber. The carcass layers 10a, 10b, 10c, and 100 each may include a plurality of identical carcass plies, or a mixture of different carcass plies. For example, one outermost carcass ply of a plurality of carcass plies being turned back may have a vulcanization degree different from that of the other carcass plies. As described above, the bias tire 1 includes two or more carcass layers.

The bias tire 1 includes a tread portion 5 provided with a groove 11. In FIG. 1, a groove bottom of the groove 11 is indicated by a dashed line. The tread portion 5 has opposite ends in the tire lateral direction, serving as shoulder portions 6, and sidewall portions 7 are each provided from the corresponding one of the shoulder portions 6 to a predetermined position radially inward. The sidewall portions 7 are disposed at two respective opposite-side positions of the bias tire 1 in the tire lateral direction. The sidewall portions 7, 7 have respective sidewall rubbers 17, 17 that are paired.

The bias tire 1 further includes belts 8, 8a serving as a fiber reinforced layer on an outer circumferential side of the carcass layer 100 in the tread portion 5. The bias tire 1 is provided on its inner side with an inner liner 9 along the carcass layer 100.

The tread portion 5 of the tire includes a tread rubber 15 disposed radially outward of the carcass layer 100 and the belts 8, 8a. The paired sidewall rubbers 17, 17 are disposed laterally outward of the carcass layer 10a, 10b, 10c, and 100 to constitute the corresponding left and right sidewall portions 7. A pair of rim cushion rubbers 20, 20 is disposed radially inward of the respective left and right bead cores 3a, 3b, and 3c, and respective left and right turned back portions of the carcass layers 10a, 10b, 10c, and 100 to constitute respective contact surfaces of the left and right bead portions 2 with flanges 30F of the rim 30.

As illustrated in FIG. 2, a cord 10in on the innermost side of the carcass layers 10a, 10b, 10c, and 100 in the tire lateral direction has a radius of curvature indicated as R1 at a position at height 1.5 times height FH of the flange 30F (FH×1.5). The cord 10in on the innermost side of the carcass layers 10a, 10b, 10c, and 100 in the tire lateral direction has a radius of curvature indicated as R3 at a position at length of one-third of a length along a tire radial direction from a position at a maximum height CH of the carcass layer 100 to a maximum width position of the carcass layer, i.e., at a height of H/3. The radius of curvature R3 is a radius of curvature of a carcass innermost surface of the shoulder portion 6. It is preferable that a ratio R1/R3 of the radius of curvature R1 to the radius of curvature R3 of the bias tire 1 is within a range from 0.5 to 1.0. Setting the ratio R1/R3 within the range described above enables CBU and ply separation to be prevented without allowing strain to be concentrated at any one of the position of the radius of curvature R1 and the position of the radius of curvature R3 when the tire is inflated and flexed.

As illustrated in FIG. 2, the bias tire 1 includes the cord 10in on the innermost side of the carcass layers 10a, 10b, 10c, and 100 in the tire lateral direction, having a radius of curvature indicated as R1 at a position at height 1.5 times the height FH of the flange 30F. The bias tire 1 also includes a cord 10out on the outermost side of the carcass layers 10a, 10b, 10c, and 100 in the tire lateral direction, having a radius of curvature indicated as R2 at a position at height 1.5 times the height FH of the flange 30F. In this case, a ratio R1/R2 of the radius of curvature R1 to the radius of curvature R2 is from 1.0 to 1.8. Typically, when the bias tire 1 is flexed, a tensile stress on a radius of curvature R2 side being an outer side of bend is more than a tensile stress on a radius of curvature R1 side. Setting the radius of curvature R1 within a range equal to or more than the radius of curvature R2 and equal to or less than 1.8 times the radius of curvature R2 enables the radius of curvature R1 side to be easily bent. As a result, the carcass layers 10a, 10b, 10c, and 100 have an equal tensile stress on each of the radius of curvature R1 side and the radius of curvature R2 side. This reduces strain among the carcass layers 10a, 10b, 10c, and 100 to enable ply separation to be prevented.

As illustrated in FIG. 2, the bias tire 1 includes the cord 10 in on the innermost side of the carcass layers 10a, 10b, 10c, and 100 in the tire lateral direction, having the radius of curvature indicated as R1, and a radius of curvature of a tire profile line is indicated as R4. At a position at height 1.5 times the height FH of the flange 30F, a ratio R1/R4 of the radius of curvature R1 to the radius of curvature R4 is 2.5 or less. Setting the ratio R1/R4 within the range described above in the bias tire 1 enables the carcass layers 10a, 10b, 10c, and 100 to be flexed following flexure of the tire profile, so that CBU due to excessive pulling can be prevented. It is more preferable that the ratio R1/R4 is 0.5 or more. When the ratio R1/R4 is less than 0.5, possibility of strain concentration due to buckling increases, and thus the ratio is not preferable.

The cord 10in on the innermost side of the carcass layer 10a in the tire lateral direction has an angle within a range from 25 degrees to 45 degrees to the tire circumferential direction. When the angle is less than 25 degrees, excessive tension is applied to each cord during deformation of the bias tire 1, and thus the angle is not preferable. When the angle is greater than 45 degrees, deformation of the bias tire 1 subjected to stress is too large, and thus the angle is not preferable. It is more preferable that the cord 10in has an angle within a range from 30 degrees to 40 degrees to the tire circumferential direction.

Figure 3:
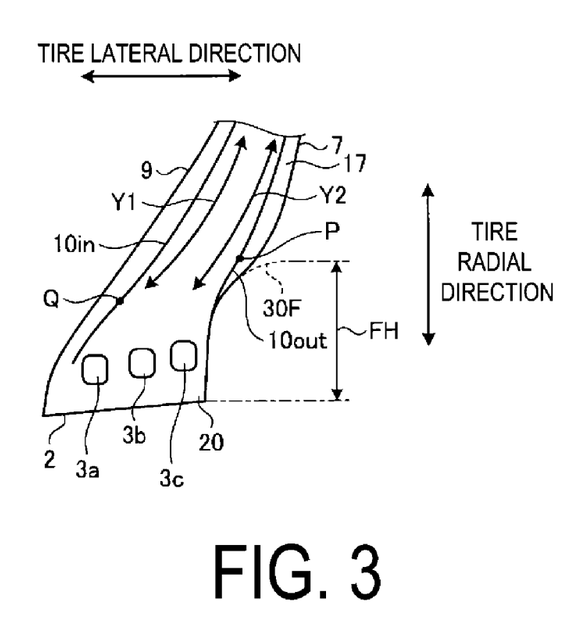
FIG. 3 is a cross-sectional view in a tire meridian direction illustrating a structure near a bead portion of the bias tire of FIG. 1.

FIG. 3 is a cross-sectional view in a tire meridian direction illustrating a structure near the bead portion 2 of the bias tire 1. In FIG. 3, the cord 10in on the innermost side of the carcass layers 10a, 10b, 10c, and 100 in the tire lateral direction has a curved shape including an inflection point Q at which the curved shape changes from projecting laterally inward to projecting laterally outward as indicated by the arrow Y1 in FIG. 3. The inflection point Q is positioned within a range of height from 0.25 times to 0.75 times the height FH of the flange 30F.

In FIG. 3, the cord 10out on the outermost side of the carcass layers 10a, 10b, 10c, and 100 in the tire lateral direction has a curved shape including an inflection point P at which the curved shape changes from projecting laterally inward to projecting laterally outward as indicated by the arrow Y2 in FIG. 3. The inflection point P is positioned within a range of height from 0.60 times to 1.15 times the height FH of the flange 30F.

In a cross section in the tire meridian direction of the bias tire 1, the curved shape of the cord 10in on the innermost side of the carcass layers 10a, 10b, 10c, and 100 in the tire lateral direction projects laterally outward at any position within a range of height from 0.9 times to 1.6 times the height FH of the flange 30F of the rim 30 on which the bias tire 1 is assembled. In addition, in a cross section in the tire meridian direction of the bias tire 1, the curved shape of the cord 10out on the outermost side of the carcass layers 10a, 10b, 10c, and 100 in the tire lateral direction projects laterally outward at any position within a range of height from 1.1 times to 1.6 times the height FH of the flange 30F of the rim 30 on which the bias tire 1 is assembled.

Example of Actual Dimensions Here, the radius of curvature R1 is 418 mm, for example, before inflated. When the bias tire 1 is inflated to the specified internal pressure, the radius of curvature R1 becomes 800 mm±40 mm, for example. The radius of curvature R2 is 391 mm, for example, before inflated. When the bias tire 1 is inflated to the specified internal pressure, the radius of curvature R2 becomes 748 mm±37 mm. The radius of curvature R3 is from 418 mm to 836 mm, for example, before inflated. When the bias tire 1 is inflated to the specified internal pressure, the radius of curvature R3 becomes from 800 mm±40 mm to 1600 mm±80 mm, for example. The radius of curvature R4 is 355 mm, for example, before inflated. When the bias tire 1 is inflated to the specified internal pressure, the radius of curvature R4 becomes 680 mm±34 mm, for example. The flange height FH of the rim 30 is 89 mm, for example.

Effect at High Load

Figure 4:
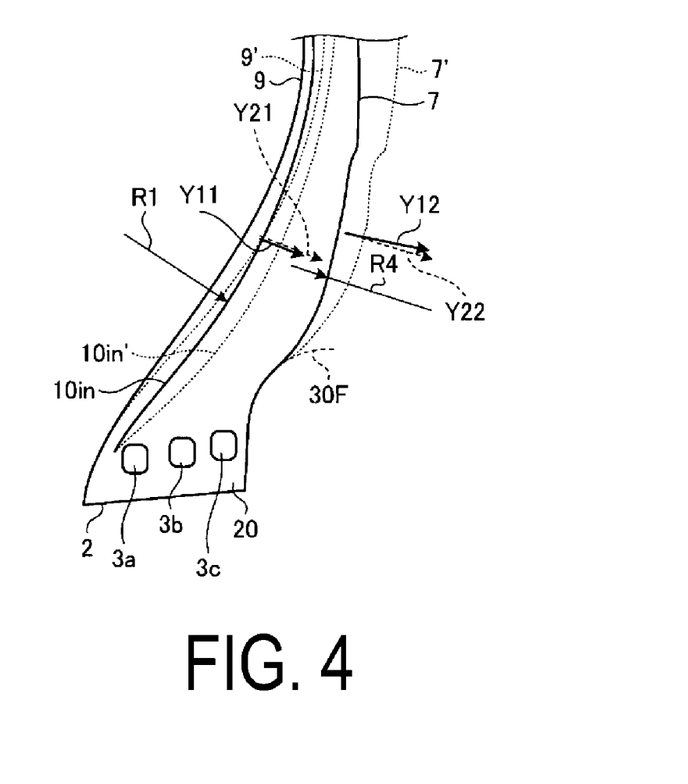
FIG. 4 is a view illustrating an effect of the bias tire of FIG. 1 at high load.

FIG. 4 is a view illustrating an effect of the bias tire 1 at high load. In FIG. 4, the inner liner 9 and the sidewall portion 7 of the bias tire 1 are each subjected to a stress including components outward in the tire lateral direction, such as indicated by arrows Y11 and Y12. In addition, the bias tire 1 is subjected to greater stresses, such as indicated by arrows Y21 and Y22, at high load, so that the inner liner 9 and the sidewall portion 7 are each flexed and displaced from the position indicated by the solid line to the position indicated by the dashed line. When the inner liner 9 and the sidewall portion 7 are displaced to positions of an inner liner 9' and a sidewall portion 7' indicated by the dashed lines, respectively, the cord 10in on the innermost side in the tire lateral direction is displaced from the position of the solid line to the position of the dashed line, as indicated by the arrow Y11 in FIG. 4. At this time, the radius of curvature R1 of the cord 10in is 418 mm, for example, and the radius of curvature R4 of the cord 10out on the outermost side in the tire lateral direction is 355 mm, for example. Even when the cord 10in is displaced to a position of a cord 10in' indicated by the dashed line, a ratio R1/R2 of from 1.0 to 1.8 does not cause CBU and ply separation.

Figure 5:
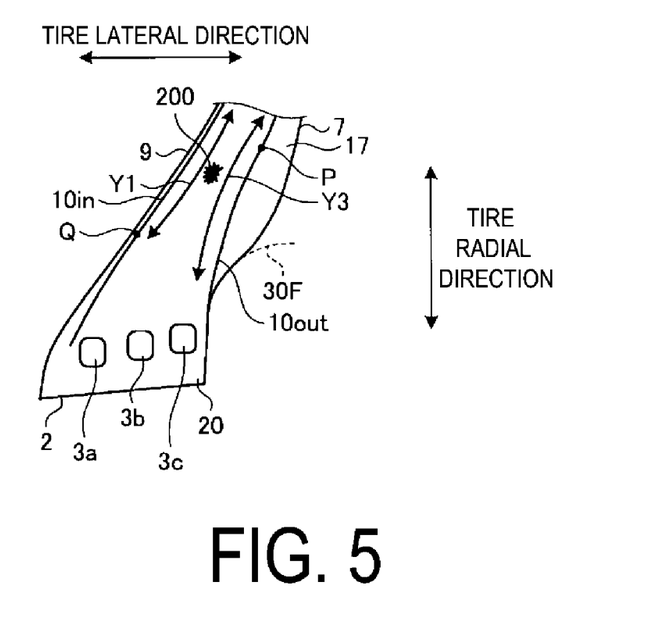
FIG. 5 is a cross-sectional view in a tire meridian direction illustrating a structure near a bead portion of a bias tire of a comparative example.
Figure 6:
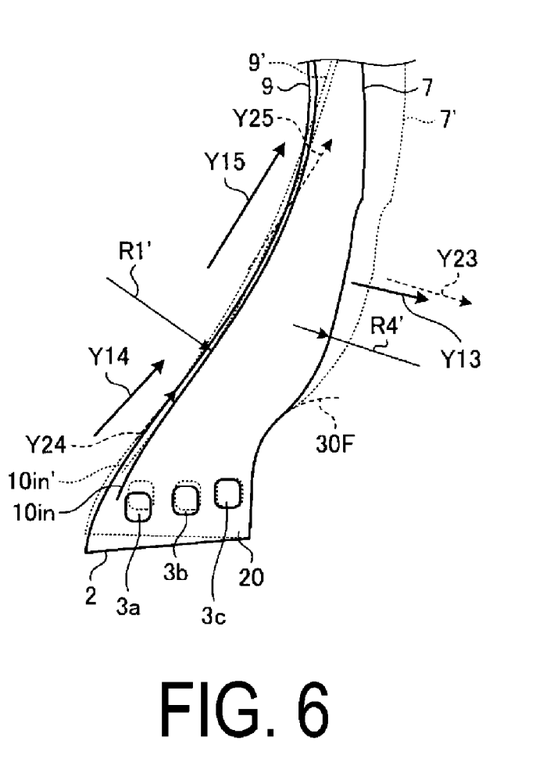
FIG. 6 is a view illustrating an effect of the bias tire of FIG. 5 at high load.

FIG. 5 is a cross-sectional view in a tire meridian direction illustrating a structure near a bead portion of a bias tire of a comparative example. FIG. 6 is a view illustrating an effect of the bias tire of FIG. 5 at high load.

In FIG. 5, the bias tire of the comparative example includes a cord 10in on the innermost side in the tire lateral direction, projecting laterally outward as indicated by an arrow Y1 in FIG. 5 at a position radially outward of an inflection point Q. However, a cord 10out on the outermost side in the tire lateral direction has an inflection point P positioned further radially outward of the inflection point P in FIG. 3. Thus, the cord 10out projects laterally inward as indicated by an arrow Y3 in FIG. 5 at a position radially inward of the inflection point P. The cord 10out on the outermost side in the tire lateral direction projects laterally inward at any position within a range of height from 1.1 times to 1.6 times the height FH of the flange 30F of the rim 30. Thus, the bias tire of the comparative example illustrated in FIG. 5 may cause ply separation 200 to occur at high load.

In FIG. 6, the bias tire of the comparative example includes an inner liner 9 and a sidewall portion 7 that are subjected to not only a stress including a component outward in the tire lateral direction, such as indicated by an arrow Y13, but also a stress including components outward in the tire radial direction, such as indicated by arrows Y14 and Y15. In addition, in FIG. 6, the bias tire of the comparative example is subjected to greater stresses, such as indicated by arrows Y23, Y24, and Y25, at high load, so that the inner liner 9 and the sidewall portion 7 are each flexed and displaced from the position indicated by the solid line to the position indicated by the dashed line. When the inner liner 9 and the sidewall portion 7 are displaced to positions of an inner liner 9' and a sidewall portion 7' indicated by the dashed lines, respectively, the cord 10in on the innermost side in the tire lateral direction is displaced from the position of the solid line to the position of the dashed line. When the cord 10in is displaced to the position indicated by the dashed line, a cord 10in' has a radius of curvature R1' (e.g., R1'=1002 mm) that is almost linear. The cord on the outermost side in the tire lateral direction has a radius of curvature R4' (e.g., R4'=355 mm) that is the same value as that in FIG. 4. In this state, when a greater stress is applied to an outer side in the tire radial direction, the bead cores 3a, 3b, and 3c may rise radially outward to result in CBU.

In contrast, the bias tire 1 according to the present embodiment is configured as described above such that in a cross section in the tire meridian direction of the bias tire 1, the curved shape of the cord 10in on the innermost side of the carcass layers 10a, 10b, 10c, and 100 in the tire lateral direction projects laterally outward at any position within a range of height from 0.9 times to 1.6 times the height FH of the flange 30F of the rim 30 on which the bias tire 1 is assembled, and that the curved shape of the cord 10out on the outermost side of the carcass layers 10a, 10b, 10c, and 100 in the tire lateral direction projects laterally outward at any position within a range of height from 1.1 times to 1.6 times the height FH of the flange 30F. This configuration enables suppressing excessive pulling of the carcass layer 10a on an inner surface side closer to a tire equatorial plane CL, so that CBU can be prevented. In addition, when a compression direction (displacement direction) of each of carcass plies adjacent to each other is set to the same direction, shear strain between the carcass plies is reduced to enable ply separation to be prevented.

Summary

To prevent CBU due to excessive pulling of a carcass, and ply separation due to a strain between a carcass layer on an inner surface side closer to a tire equatorial plane and a carcass layer on an outer surface side farther away from the tire equatorial plane, it is conceivable to increase the number of carcass cords to withstand excessive pulling, and to increase a rubber gauge between carcass layers to withstand an interlayer as typical measures. Unfortunately, these measures lead to an increase in cost and weight. In addition, an increase in the number of carcass cords as well as in rubber gauge is limited due to a bead base width of a rim. According to the bias tire of the present embodiment, excessive pulling of a bead portion and a carcass layer can be suppressed, and the bias tire can be improved in durability performance without increasing the number of carcass cords and a rubber gauge.

Example 1

Durability performance was evaluated for the bias tire 1 of the present embodiment. In the present example, a vehicle with a tire of a size of 29.5-25 L22 mounted on a specified rim was traveled under conditions where the tire was inflated to 650 kPa (TRA standard: 350 kPa), and was subjected to 150% load, to evaluate durability performance with a travel time until bead failure occurred.

As a conventional example, there was prepared a tire configured as follows: the cord 10in on the innermost side in the tire lateral direction had a substantially linear shape; the cord 10out on the outermost side in the tire lateral direction had a curved shape projecting laterally inward; a value of a ratio R1/R3 was 0.26; a bead filler had thickness gradually decreasing radially outward; height of the bead filler having the highest height in the tire radial direction was 0.15 times a cross-sectional height CH of a carcass; another carcass layer for covering carcass layers corresponding to respective bead cores was not provided; a value of the ratio R1/R2 was 3.0; a value of a ratio R1/R4 was 2.8; the cord 10in had an inflection point at a position out of a range of height from 0.25 times to 0.75 times a height of a flange; and the cord 10out had an inflection point at a position out of a range of height from 0.60 times to 1.15 times the height of the flange.

As a comparative example, there was prepared a tire configured as follows: the cord 10in on the innermost side in the tire lateral direction had a curved shape projecting laterally outward; the cord 10out on the outermost side in the tire lateral direction had a curved shape projecting laterally inward; a value of a ratio R1/R3 was 0.26; a bead filler had thickness gradually decreasing radially outward; height of the bead filler having the highest height in the tire radial direction was 0.15 times a cross-sectional height CH of a carcass; another carcass layer for covering carcass layers corresponding to respective bead cores was not provided; a value of the ratio R1/R2 was 3.0; a value of a ratio R1/R4 was 2.8; the cord 10in had an inflection point at a position out of a range of height from 0.25 to 0.75 times a height of a flange; and the cord 10out had an inflection point at a position out of a range of height from 0.60 times to 1.15 times the height of the flange.

As shown in Tables 1 and 2, bias tires of Examples 1 to 13 each included the cord 10in on the innermost side in the tire lateral direction, having a curved shape projecting laterally outward, and the cord 10out on the outermost side in the tire lateral direction, having a curved shape projecting laterally outward. In Examples 1 to 13, each of the bias tires had a value of the ratio R1/R3 of 0.26, 0.5, 0.75, or 1.0. Each of the bias tires of Examples 1 to 13 included the bead filler having thickness gradually decreasing radially outward. Each of the bias tires of Examples 1 to 13 had a height of the bead filler having the highest height in the tire radial direction, the height being 0.15 times, 0.16 times, 0.17 times, 0.20 times, or 0.23 times the cross-sectional height CH of a carcass. The bias tires of Examples 1 to 6 each did not include another carcass layer for further covering carcass layers corresponding to respective bead cores, and the bias tires of Examples 7 to 13 each included another carcass layer for further covering carcass layers corresponding to respective bead cores. The bias tires of Examples 1 to 13 each had a value of the ratio R1/R2 of 1.0, 1.4, 1.8, or 3.0. The bias tires of Examples 1 to 13 each had a value of the ratio R1/R4 of 0.5, 1.5, 2.5, or 2.8. The bias tires of Examples 1 to 13 each included the cord 10in having an inflection point at a position within a range of height from 0.25 times to 0.75 times the height of the flange, and the cord 10out having an inflection point at a position within a range of height from 0.60 times to 1.15 times the height of the flange.

In each of Conventional Example, Comparative Example, and Examples 1 to 13, the number of carcass plies constituting each of the carcass layers 10a, 10b, 10c, and 100 was set to be from four to eight, and an angle of a cord of a carcass layer on the innermost side in the tire lateral direction was set to be from 25 degrees to 45 degrees to the tire circumferential direction.

According to Tables 1 and 2, a favorable result was obtained in the following cases: when each of the cord 10in on the innermost side in the tire lateral direction and the cord 10out on the outermost side in the tire lateral direction had a curved shape projecting laterally outward; when a ratio R1/R3 was from 0.5 to 1.0; when a height of the bead filler having the highest height in the tire radial direction was within a range of height from 0.17 times to 0.23 times the cross-sectional height CH of a carcass; when there was provided another carcass layer for further covering carcass layers corresponding to respective bead cores: when a ratio R1/R2 was from 1.0 to 1.8; when a ratio R1/R4 was 2.5 or less; and when the cord 10in had an inflection point at a position within a range of height from 0.25 times to 0.75 times the height of the flange, and the cord 10out had an inflection point at a position within a range of height from 0.60 times to 1.15 times the height of the flange.

TABLE 1

|  | Conventional Example | Comparative Example | Example 1 | Example 2 |
|---|---|---|---|---|
| Shape of cord 10in | Straight line | Outwardly projecting | Outwardly projecting | Outwardly projecting |
| Shape of cord 10out | Inwardly projecting | Inwardly projecting | Outwardly projecting | Outwardly projecting |
| Ratio R1/R3 | 0.26 | 0.26 | 0.26 | 0.5 |
| Thickness of bead filler | Gradual decrease | Gradual decrease | Gradual decrease | Gradual decrease |
| Height of bead filler/ Cross-sectional height CH of carcass | 0.15 | 0.15 | 0.15 | 0.15 |
| Another carcass layer | No | No | No | No |
| Ratio R1/R2 | 3.0 | 3.0 | 3.0 | 3.0 |
| Ratio R1/R4 | 2.8 | 2.8 | 2.8 | 2.8 |
| Inflection point of cord 10in | Out of range | Out of range | Within range | Within range |
| Inflection point of cord 10out | Out of range | Out of range | Within range | Within range |
| Travel time until bead failure occurs | 1000 | 1500 | 2500 | 3000 |

|  | Example 3 | Example 4 | Example 5 | Example 6 |
|---|---|---|---|---|
| Shape of cord 10in | Outwardly projecting | Outwardly projecting | Outwardly projecting | Outwardly projecting |
| Shape of cord 10out | Outwardly projecting | Outwardly projecting | Outwardly projecting | Outwardly projecting |
| Ratio R1/R3 | 0.75 | 1.0 | 1.0 | 1.0 |
| Thickness of bead filler | Gradual decrease | Gradual decrease | Gradual decrease | Gradual decrease |
| Height of bead filler/ Cross-sectional height CH of carcass | 0.16 | 0.15 | 0.17 | 0.23 |
| Another carcass layer | No | No | No | No |
| Ratio R1/R2 | 3.0 | 3.0 | 3.0 | 3.0 |
| Ratio R1/R4 | 2.8 | 2.8 | 2.8 | 2.8 |
| Inflection point of cord 10in | Within range | Within range | Within range | Within range |
| Inflection point of cord 10out | Within range | Within range | Within range | Within range |
| Travel time until bead failure occurs | 3500 | 3000 | 3200 | 3400 |

TABLE 2

|  | Example 7 | Example 8 | Example 9 | Example 10 |
|---|---|---|---|---|
| Shape of cord 10in | Outwardly projecting | Outwardly projecting | Outwardly projecting | Outwardly projecting |
| Shape of cord 10out | Outwardly projecting | Outwardly projecting | Outwardly projecting | Outwardly projecting |
| Ratio R1/R3 | 1.0 | 0.75 | 0.75 | 0.75 |

TABLE 2-continued

| | | | | |
|---|---|---|---|---|
| Thickness of bead filler | Gradual decrease | Gradual decrease | Gradual decrease | Gradual decrease |
| Height of bead filler/ Cross-sectional height CH of carcass | 0.20 | 0.20 | 0.20 | 0.20 |
| Another carcass layer | Yes | Yes | Yes | Yes |
| Ratio R1/R2 | 3.0 | 1.0 | 1.4 | 1.8 |
| Ratio R1/R4 | 2.8 | 2.8 | 2.8 | 2.8 |
| Inflection point of cord 10in | Within range | Within range | Within range | Within range |
| Inflection point of cord 10out | Within range | Within range | Within range | Within range |
| Travel time until bead failure occurs | 3,300 | 4000 | 4500 | 4000 |

| | Example 11 | Example 12 | Example 13 |
|---|---|---|---|
| Shape of cord 10in | Outwardly projecting | Outwardly projecting | Outwardly projecting |
| Shape of cord 10out | Outwardly projecting | Outwardly projecting | Outwardly projecting |
| Ratio R1/R3 | 0.75 | 0.75 | 0.75 |
| Thickness of bead filler | Gradual decrease | Gradual decrease | Gradual decrease |
| Height of bead filler/ Cross-sectional height CH of carcass | 0.20 | 0.20 | 0.20 |
| Another carcass layer | Yes | Yes | Yes |
| Ratio R1/R2 | 1.4 | 1.4 | 1.4 |
| Ratio R1/R4 | 0.5 | 1.5 | 2.5 |
| Inflection point of cord 10in | Within range | Within range | Within range |
| Inflection point of cord 10out | Within range | Within range | Within range |
| Travel time until bead failure occurs | 5000 | 6000 | 5000 |

The invention claimed is:

1. A bias tire comprising:
a pair of bead cores;
a bead filler disposed outward of each of the pair of bead cores in a tire radial direction; and
a carcass layer stretching between the respective pair of bead cores, wrapping around end portions of the respective bead cores, the carcass layer having opposite ends turned back to be fixed,
in a cross section in a tire meridian direction, a cord on an innermost side of the carcass layer in a tire lateral direction having a curved shape projecting laterally outward at any position within a range of height from 0.9 times to 1.6 times a height of a flange of a rim on which the bias tire is assembled, and
in the cross section in the tire meridian direction, a cord on an outermost side of the carcass layer in the tire lateral direction having a curved shape projecting laterally outward at any position within a range of height from 1.1 times to 1.6 times the height of the flange;
wherein at a position at height 1.5 times the height of the flange in a cross section in the tire meridian direction, the radius of curvature R1 of the cord on the innermost side of the carcass layer in the tire lateral direction, and a radius of curvature R2 of the cord on the outermost side of the carcass layer in the tire lateral direction, have a ratio R1/R2 that is from 1.0 to 1.8.

2. A bias tire comprising:
a pair of bead cores;
a bead filler disposed outward of each of the pair of bead cores in a tire radial direction; and
a carcass layer stretching between the respective pair of bead cores, wrapping around end portions of the respective bead cores, the carcass layer having opposite ends turned back to be fixed,
in a cross section in a tire meridian direction, a cord on an innermost side of the carcass layer in a tire lateral direction having a curved shape projecting laterally outward at any position within a range of height from 0.9 times to 1.6 times a height of a flange of a rim on which the bias tire is assembled, and
in the cross section in the tire meridian direction, a cord on an outermost side of the carcass layer in the tire lateral direction having a curved shape projecting laterally outward at any position within a range of height from 1.1 times to 1.6 times the height of the flange;
wherein at a position at height 1.5 times the height of the flange in a cross section in the tire meridian direction, the radius of curvature R1 of the cord on the innermost side of the carcass layer in the tire lateral direction, and a radius of curvature R4 of a tire profile line, have a ratio R1/R4 that is 2.5 or less.

3. A bias tire comprising:
a pair of bead cores;
a bead filler disposed outward of each of the pair of bead cores in a tire radial direction;
a carcass layer stretching between the respective pair of bead cores, wrapping around end portions of the respective bead cores, the carcass layer having opposite ends turned back to be fixed;
the pair of bead cores is one of a plurality of the pairs of bead cores;
a plurality of the bead fillers and a. plurality of the carcass layers are provided corresponding to the respective bead cores;
cord directions of the carcass layers intersect each other between adjacent carcass layers;
the plurality of the carcass layers is turned. back to be fixed while wrapping around the corresponding bead cores and the bead fillers corresponding to the respective bead cores; and
in a cross section in a tire meridian direction, one of the plurality of bead fillers has a maximum height in the tire radial direction, the maximum height being from 0.17 times to 0.23 times a cross-sectional height of a carcass, in the cross section in the tire meridian direction, a cord on an innermost side of the carcass layer in a tire lateral direction having a curved shape projecting laterally outward at any position within a range of height from 0.9 times to 1.6 times a height of a flange of a rim on which the bias tire is assembled, and in the cross section in the tire meridian direction, a cord on an outermost side of the carcass layer in the tire lateral direction having a curved shape projecting laterally outward at any position within a range of height from 1.1 times to 1.6 times the height of the flange;

wherein in a cross section in the tire meridian direction, the cord on the innermost side of the carcass layer in the tire lateral direction has a radius of curvature R1 at a position at height 1.5 times the height of the flange, and has a radius of curvature R3 at a position at length of one-third of a length along the tire radial direction from a maximum height position of the carcass layer to a maximum width position of the carcass layer, a ratio R1/R3 being from 0.5 to 0.9.

4. The bias tire according to claim 3, wherein the ratio R1/R3 is from 0.5 to 0.7.

5. The bias tire according to claim 3, wherein the carcass layer of the bias tire includes a plurality of carcass plies with cord directions intersecting each other.

6. The bias tire according to claim 3, further comprising: another carcass layer for covering the plurality of the carcass layers corresponding to the respective plurality of the pairs of bead cores.

7. The bias tire according to claim 3, wherein at a position at height 1.5 times the height of the flange in a cross section in the tire meridian direction, the radius of curvature R1 of the cord on the innermost side of the carcass layer in the tire lateral direction, and a radius of curvature R2 of the cord on the outermost side of the carcass layer in the tire lateral direction, have a ratio R1/R2 that is from 1.0 to 1.8.

8. The bias tire according to claim 3, wherein at a position at height 1.5 times the height of the flange in a cross section in the tire meridian direction, the radius of curvature R1 of the cord on the innermost side of the carcass layer in the tire lateral direction, and a radius of curvature R4 of a tire profile line, have a ratio R1/R4 that is 2.5 or less.

9. The bias tire according to claim 3, wherein the carcass layer includes from four to eight carcasses.

10. The bias tire according to claim 3, wherein the cord on the innermost side of the carcass layer in the tire lateral direction has an angle of from 25 degrees to 45 degrees to a tire circumferential direction.

11. The bias tire according to claim 3, wherein
in a cross section in the tire meridian direction, the cord on the innermost side of the carcass layer in the tire lateral direction has the curved shape including an inflection point at which the curved shape changes from projecting laterally inward to projecting laterally outward, and the inflection point is positioned within a range of height from 0.25 times to 0.75 times the height of the flange.

12. The bias tire according to claim 3, wherein
in a cross section in the tire meridian direction, the cord on the outermost side of the carcass layer in the tire lateral direction has the curved shape including an inflection point at which the curved shape changes from projecting laterally inward to projecting laterally outward, and the inflection point is positioned within a range of height from 0.60 times to 1.15 times the height of the flange.

13. The bias tire according to claim 3, wherein in a cross section in the tire meridian direction, the bead filler has a thickness in the tire lateral direction that gradually decreases radially outward from the corresponding one of the bead cores.

14. The bias tire according to claim further comprising:
another carcass layer for covering the plurality of the carcass layers corresponding to the respective plurality of the pairs of bead cores.

15. The bias tire according to claim 14, wherein at a position at height 1.5 times the height of the flange in a cross section in the tire meridian direction, the radius of curvature R1 of the cord on the innermost side of the carcass layer in the tire lateral direction, and a radius of curvature R2 of the cord on the outermost side of the carcass layer in the tire lateral direction, have a ratio R1/R2 that is from 1.0 to 1.8.

16. The bias tire according to claim 15, wherein at a position at height 1.5 times the height of the flange in a cross section in the tire meridian direction, the radius of curvature R1 of the cord on the innermost side of the carcass layer in the tire lateral direction, and a radius of curvature R4 of a tire profile line, have a ratio R1/R4 that is 2.5 or less.

17. The bias tire according to claim 16, wherein the carcass layer includes from four to eight carcasses.

18. The bias tire according to claim 17, wherein the cord on the innermost side of the carcass layer in the tire lateral direction has an angle of from 25 degrees to 45 degrees to a tire circumferential direction.

19. The bias tire according to claim 18, wherein
in a cross section in the tire meridian direction, the cord on the innermost side of the carcass layer in the tire lateral direction has the curved shape including an inflection point at which the curved shape changes from projecting laterally inward to projecting laterally outward, and the inflection point is positioned within a range of height from 0.25 times to 0.75 times the height of the flange.

20. The bias tire according to claim 19, wherein
in a cross section in the tire meridian direction, the cord on the outermost side of the carcass layer in the tire lateral direction has the curved shape including an inflection point at which the curved shape changes from projecting laterally inward to projecting laterally outward, and the inflection point is positioned within a range of height from 0.60 times to 1.15 times the height of the flange.

* * * * *